United States Patent
Turner et al.

(10) Patent No.: US 11,573,153 B2
(45) Date of Patent: Feb. 7, 2023

(54) PREDICTION OF MACHINE FAILURE BASED ON VIBRATION TREND INFORMATION

(71) Applicant: Computational Systems, Inc., Knoxville, TN (US)

(72) Inventors: John S. Turner, Knoxville, TN (US); Robert D. Skeirik, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 686 days.

(21) Appl. No.: 16/546,385

(22) Filed: Aug. 21, 2019

(65) Prior Publication Data
US 2021/0055183 A1 Feb. 25, 2021

(51) Int. Cl.
| | |
|---|---|
| *G01M 13/045* | (2019.01) |
| *G01H 1/00* | (2006.01) |
| *G07C 3/06* | (2006.01) |
| *G05B 23/02* | (2006.01) |
| *G05D 19/02* | (2006.01) |

(52) U.S. Cl.
CPC .......... *G01M 13/045* (2013.01); *G01H 1/006* (2013.01); *G05B 23/0256* (2013.01); *G05D 19/02* (2013.01); *G07C 3/06* (2013.01)

(58) Field of Classification Search
None
See application file for complete search history.

(56) References Cited

U.S. PATENT DOCUMENTS

| | | |
|---|---|---|
| 5,680,025 A | 10/1997 | Bowers et al. |
| 5,726,911 A | 3/1998 | Canada et al. |
| 5,772,128 A | 6/1998 | McRae |
| 5,852,351 A | 12/1998 | Canada et al. |
| 5,854,994 A * | 12/1998 | Canada .................... G07C 3/00 702/56 |
| 5,875,420 A | 2/1999 | Piety et al. |
| 5,907,491 A | 5/1999 | Canada et al. |
| 5,943,634 A | 8/1999 | Piety et al. |
| 6,087,796 A | 7/2000 | Canada et al. |
| 6,138,078 A | 10/2000 | Canada et al. |
| 6,192,325 B1 | 2/2001 | Piety et al. |

(Continued)

*Primary Examiner* — Raul J Rios Russo
*Assistant Examiner* — Carl F. R. Tchatchouang
(74) *Attorney, Agent, or Firm* — Luedeka Neely Group PC

(57) ABSTRACT

A method for detecting defects in a rotational element of a machine based on changes in measured vibration energy includes: (a) collecting vibration data over an extended period of time using vibration sensors attached to the machine; (b) processing the vibration data to generate a time waveform comprising processed vibration values sampled during sequential sampling time intervals within the extended period of time; (c) detecting multiple time blocks within the extended period of time during which the processed vibration values exhibit sustained increases at progressively increasing rates; and (d) generating alerts based on detection of the multiple time blocks during which the processed vibration values exhibit sustained increases at progressively increasing rates. The multiple time blocks may include a first time block during which the processed vibration values increase at a first rate, and a second time block occurring after the first time block during which the processed vibration values increase at a second rate that is greater than the first rate.

11 Claims, 3 Drawing Sheets

(56) References Cited

U.S. PATENT DOCUMENTS

| | | | |
|---|---|---|---|
| 6,220,098 B1 | 4/2001 | Johnson et al. | |
| 6,297,742 B1 | 10/2001 | Canada et al. | |
| 6,301,514 B1 | 10/2001 | Canada et al. | |
| 6,529,135 B1 | 3/2003 | Bowers et al. | |
| 7,561,200 B2* | 7/2009 | Garvey, III | H04N 5/77 |
| | | | 348/333.01 |
| 7,634,384 B2 | 12/2009 | Eryurek et al. | |
| 7,725,274 B2 | 5/2010 | Slemp et al. | |
| 8,648,860 B2 | 2/2014 | Vrba et al. | |
| 8,958,900 B2 | 2/2015 | Steele et al. | |
| 9,759,213 B2* | 9/2017 | Bassett | F04B 49/065 |
| 9,791,422 B2 | 10/2017 | Bowers et al. | |
| 10,311,703 B1 | 6/2019 | Hayzen et al. | |
| 10,416,126 B2 | 9/2019 | Bowers et al. | |
| 2006/0161397 A1 | 7/2006 | Hayzen et al. | |
| 2008/0106424 A1 | 5/2008 | Bouse et al. | |
| 2009/0093975 A1* | 4/2009 | Judd | G01H 13/00 |
| | | | 702/56 |
| 2010/0089161 A1* | 4/2010 | Taheri | G01M 7/025 |
| | | | 73/588 |
| 2014/0195197 A1* | 7/2014 | Boerhout | H04W 52/0261 |
| | | | 702/182 |
| 2014/0324367 A1* | 10/2014 | Garvey, III | G01D 18/00 |
| | | | 702/56 |
| 2017/0104760 A1 | 4/2017 | Hilemon et al. | |
| 2017/0219461 A1 | 8/2017 | Duncan et al. | |
| 2019/0228636 A1 | 7/2019 | Hayzen | |
| 2019/0310281 A1 | 10/2019 | Hayzen et al. | |

\* cited by examiner

PREDICTION OF MACHINE FAILURE BASED ON VIBRATION TREND INFORMATION

FIELD

This invention relates to the field of machine vibration analysis. More particularly, this invention relates to a system for predicting machine failure based on a rate of change of a measured machine vibration value.

BACKGROUND

Users of machine vibration monitoring systems can choose from a multitude of product offerings to measure, filter, and generate alarms on various vibration values. In each case, the vibration value is compared to preset alert limits. The International Standardization Organization (ISO) Standard 10816 attempts to define absolute pre-established limits for overall vibration between 10 Hz and 1000 Hz. Although this can be useful in detecting gross failures, such as a massive rotor imbalance, is less useful in detecting more difficult and crippling problems, such as rolling element bearing defects, gear defects, and under-lubrication.

Consequently, narrowband analysis has been developed that limits the calculation of the overall vibration value to vibration occurring within a limited frequency range. This overall vibration value in a limited frequency range is then correlated to a specific potential defect that could occur on a machine (e.g. damaged or corroded blades on a fan). Using various mathematical formulas, the overall vibration within the frequency band can be characterized and compared to an absolute pre-established limit. In the specific case of PeakVue™ signal processing developed by Emerson Process Management, the vibration signals referred to above are filtered out to listen for high frequency impacting. It is also possible to establish meaningful alert limits based on the turning speed of the machine. However, even this method generates alerts based on comparison to some absolute, pre-established limit.

There are also software-based alerts that utilize the trend of vibration values together with mathematical models to project the trend into the future. This projection is typically compared to an absolute, pre-established limit in an attempt to determine the point in time at which the vibration value will reach the limit (and presumably, the machine defect will reach a "critical" stage.)

All of these methods share a reliance on an absolute, pre-established alert limit. In many cases, the pre-established alert limit must be input by the end user. In some cases, the alert limit may be derived from other inputs, such as the machine speed and type. In other applications, the alert limit may be derived using a percent increase over a baseline reading. More complex methods may combine these techniques. Generally, however, all of these methods compare a calculated vibration value (and/or an extrapolated value) to an absolute, pre-established alert level.

In all cases, the generation of an alert based on a measured or extrapolated vibration value is an attempt to notify an end user that the condition of the machine being monitored has degraded to an unacceptable level, so that appropriate maintenance work can be initiated.

In prior systems, the quality of these alerts was determined solely by the ability of the end user and/or software routines to establish a meaningful absolute, pre-defined alert level. However, end users rarely have sufficient time to master the function of the alert mechanism, to implement it, and to maintain it. Due to insufficient staffing, end users must continually make decisions regarding the most critical assets on which to focus maintenance work during a scheduled outage or determine whether an unscheduled outage is warranted based the condition of the equipment.

In summary, prior methods for generating alerts have been based on an absolute pre-determined alert level, and none have provided a reliable indication of imminent machine failure without manipulation of the model by the end user.

What is needed, therefore, is a system for generating user alerts based on measured machine vibration that does not require specific alert levels that are preestablished by the end user, or that are calculated automatically by an algorithm or drawn from a standard, such as ISO 10816 for the monitored machine.

SUMMARY

The above and other needs are met by an automated system for detecting the stage of a mechanical defect—such a fault in a rolling element bearing—and generating user alerts based on the detected stage. Preferred embodiments provide this functionality without requiring the end user to establish specific alert levels. Although no user input is required, the quality of alerts may be increased by the user inputting a nominal rotating speed or speed range for the machine.

Mechanical deterioration in machines due to certain common faults (e.g. rolling element bearing failure) can typically be broken down into definable stages of wear in a progression toward machine failure. For example, in the case of an outer race defect in a rolling element bearing, the stages may be characterized as follows.

| Stage | Characteristics |
| --- | --- |
| 1 | Sub-surface cracking and weakening of the bearing metal, but no actual loss of bearing metal, and thus not visible to the human eye. |
| 2 | Minor pitting in the bearing metal, with release of fine particles into the oil which circulate through the bearing and create a slight acceleration in the wear rate. |
| 3 | Major pitting in the bearing metal, with release of larger particles into the oil. The bearing acts as a "mill" that grinds up the particles. The particles create significant secondary damage and acceleration of wear. |
| 4 | Severe pitting continues the "mill" action at an accelerated rate. In addition, it exposes rough edges. These two factors combined cause a sharp increase in the amplitude of the impacting that generates rapid movement toward complete failure of the bearing. |

This basic pattern of deterioration typically occurs in a bearing defect regardless of the absolute amplitude of a measured or extrapolated vibration value.

Preferred embodiments of a system described herein monitor the rate of deterioration to distinguish between the various stages. More specifically, preferred embodiments provide an apparatus and method for determining the rate of change of a measured vibration value and using relative increases in the rate of change to identify the stage of deterioration for the given mechanical defect.

Preferred embodiments of the method described herein are particularly useful in analyzing antifriction bearings and gear sets. These embodiments do not require the user to set threshold levels for the vibration value, and do not rely on any absolute threshold value established by the end user, calculated automatically by an algorithm, or drawn from a standard, such as ISO 10816. Rather, by focusing on successive increases in the rate of change of the vibration value, preferred embodiments provide the end user with an automated and reliable means of determining the most critical impending asset point failures.

Some embodiments described herein are directed to a method for detecting defects in a rotational element of a machine based on changes in measured vibration energy over an extended period of time. The method includes:

(a) collecting vibration data over the extended period of time using one or more vibration sensors attached to the machine;

(b) processing the vibration data to generate a time waveform and using an algorithm (e.g. highest amplitude values, selective decimation) to generate a calculated parameter, henceforth referred to as VIBX, that characterizes the vibration signal sampled during sequential sampling time intervals within the extended period of time;

(c) detecting multiple time blocks within the extended period of time during which the VIBX values exhibit sustained increases at progressively increasing rates; and (d) generating one or more alerts based on detection of the multiple time blocks during which the VIBX values exhibit sustained increases at progressively increasing rates.

In some embodiments, the multiple time blocks include a first time block during which the VIBX values increase at a first rate, and a second time block occurring after the first time block during which the VIBX values increase at a second rate that is greater than the first rate.

In some embodiments, the first rate of increase in the VIBX values is indicative of a first stage of deterioration of the rotational element due to a defect therein, and the second rate of increase in the VIBX values is indicative of a second stage of deterioration of the rotational element that is more severe than the first stage.

In some embodiments, the VIBX values comprise PeakVue values.

In some embodiments, the rates of increase in the VIBX values are determined based on a curve fit or linear regression calculated over a moving time window.

In another aspect, some embodiments described herein are directed to an apparatus for detecting defects in a rotational element of a machine based on changes in measured vibration energy over an extended period of time. The apparatus includes one or more vibration sensors attached to the machine for collecting vibration data over the extended period of time. A processor receives the vibration data and executes instructions to process the vibration data to:

generate a time waveform comprising VIBX values sampled during sequential sampling time intervals within the extended period of time;

detect multiple time blocks within the extended period of time during which the VIBX values exhibit sustained increases at progressively increasing rates; and generate one or more alerts based on detection of the multiple time blocks during which the VIBX values exhibit sustained increases at progressively increasing rates.

In some embodiments, the processor is a component of a portable vibration analyzer, a battery powered monitoring device (e.g. transmitter) that samples intermittently, which might also utilize a wireless link, a continuous or near continuous online vibration monitoring system, or a vibration analysis computer.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
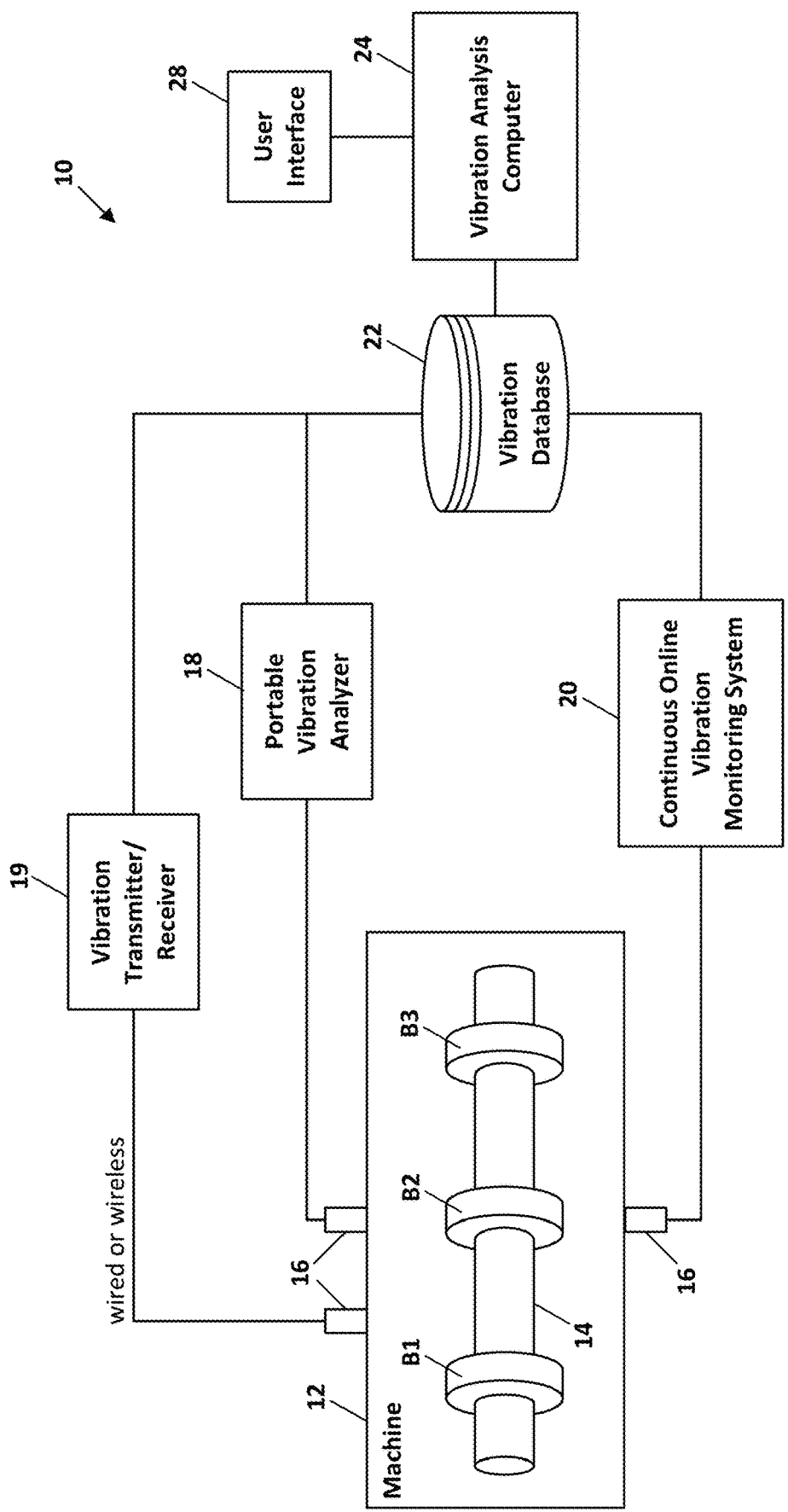
FIG. 1 depicts a vibration data collection and analysis system according to an embodiment of the invention.
Figure 2:
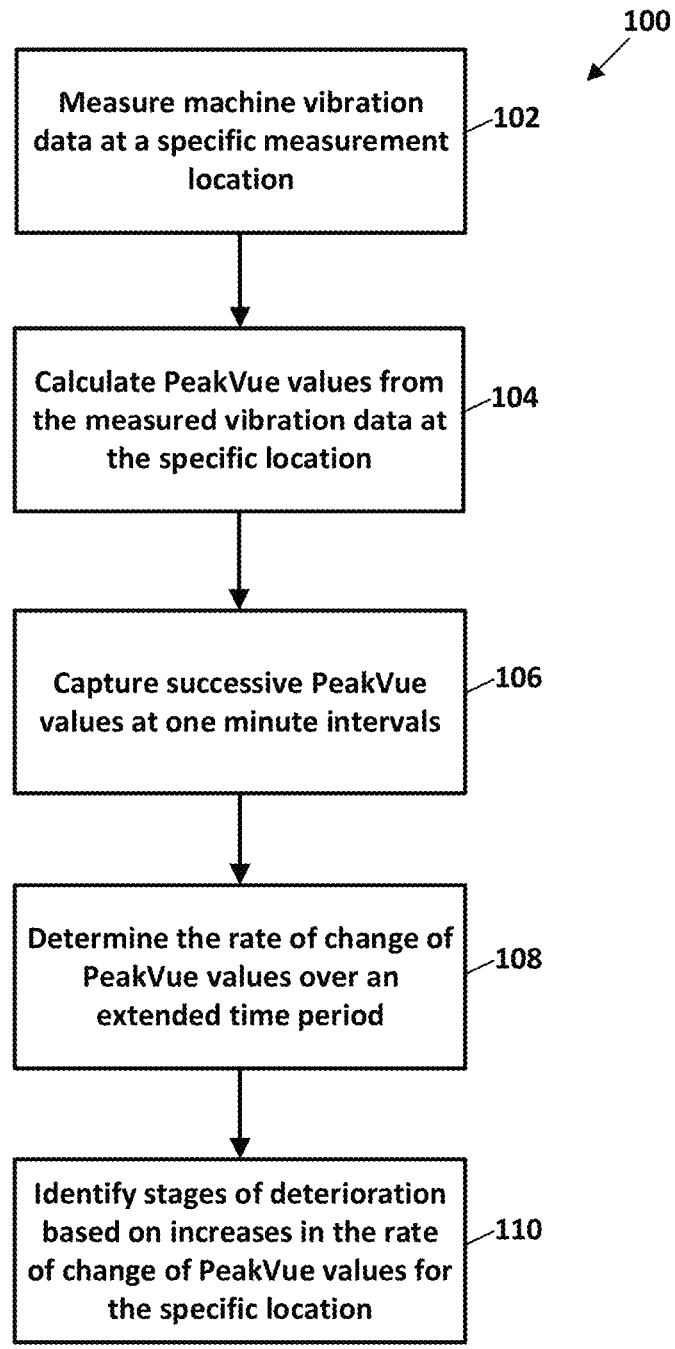
FIG. 2 depicts method for processing vibration data to identify stages of deterioration of rotating components of a machine according to an embodiment of the invention.

As depicted in FIG. 1, a vibration measurement and analysis system 10 includes vibration sensors 16 attached to a machine 12. FIG. 2 depicts a process 100 performed using the system 10 of FIG. 1 for collecting and analyzing vibration data to determine a rate of change of a measured vibration scalar value associated with the machine 12, and using the rate of change to identify stages of deterioration of components of the machine 12. The machine 12 includes at least one rotating component 14, such as a shaft supported by bearings B1, B2, and B3. The vibration sensors 16 may be placed on the machine 12 in vertical, horizontal and axial positions at each bearing location. The vibration sensors 16 generate vibration signals representative of the vibration of the machine 12, which include vibration components associated with the bearings B1, B2, and B3. The vibration signals are received, conditioned, and converted to time waveform digital data by one or more vibration data collectors, such as a portable vibration analyzer 18, a vibration transmitter/receiver 19 (wired or wireless), or a continuous online vibration monitoring system 20 (step 102 in FIG. 2). The vibration data collectors 18, 19, and 20 include signal conditioning circuitry and analog-to-digital conversion circuitry for conditioning the vibration signals from the sensors 16 and generating the time waveform digital vibration data based thereon.

The vibration time waveform data are preferably stored in a vibration database 22 from which the data is available for analysis by software routines executed on a vibration analysis computer 24. Alternatively, the vibration time waveform data are stored in data storage devices in the portable vibration analyzer 18, vibration transmitter/receiver 19, or the continuous online vibration monitoring system 20. In preferred embodiments, the system 10 includes a user interface 28, such as a touch screen, that allows a user to view measurement results, select certain measurement parameters, and provide other input as described herein.

In various embodiments, a processor in the portable vibration analyzer 18, the vibration transmitter/receiver 19, the continuous online vibration monitoring system 20, or the vibration analysis computer 24 performs steps 104 through 110 in the method of FIG. 2. In step 104, the vibration time waveform data is processed to generate PeakVue™ scalar data, which comprise one example of VIBX data values (step 104). PeakVue™ data is generally understood to comprise the peak amplitude values sampled during sequential sampling time intervals in the rectified vibration time waveform. PeakVue™ trend data is then generated by capturing trend values from the PeakVue™ data at successive time intervals for the same measurement location on the machine 12 (step 106). As the term is used herein, "successive" refers to various periodic spacings of trend value capture intervals. While the periodicity of these capture intervals can be at any spacing, generally the capture intervals should be close enough in time for the rate of change assessment to be meaningful. In one embodiment, the spacing of the trend values is once per minute. The spacing could be greater or less in other embodiments, but is preferably no greater than 60 minutes.

The rate of change of the trend values is determined over an extended period of time, such as over some number of days, weeks, or months (step 108). In a preferred embodiment, the rate of change is determined based on a curve fit or linear regression calculated over a moving time window in the trend values, such as over the prior 24 hours. To provide additional verification, some embodiments implement two or more time windows of different length to determine the rate of change, such as the last day, the last three days, and the last week.

Identifying the stage of deterioration of a rotating element is preferably based on determining the rate of change in the PeakVue™ trend values over time, and assessing the acceleration in the change in the PeakVue™ trend values. In some embodiments, databases of historical collections of PeakVue™ values measured over the courses of various types of rotating element failures are accessed to determine associations between stages of deterioration and the acceleration in the change in PeakVue™ values that occur during the various stages.

Figure 3:
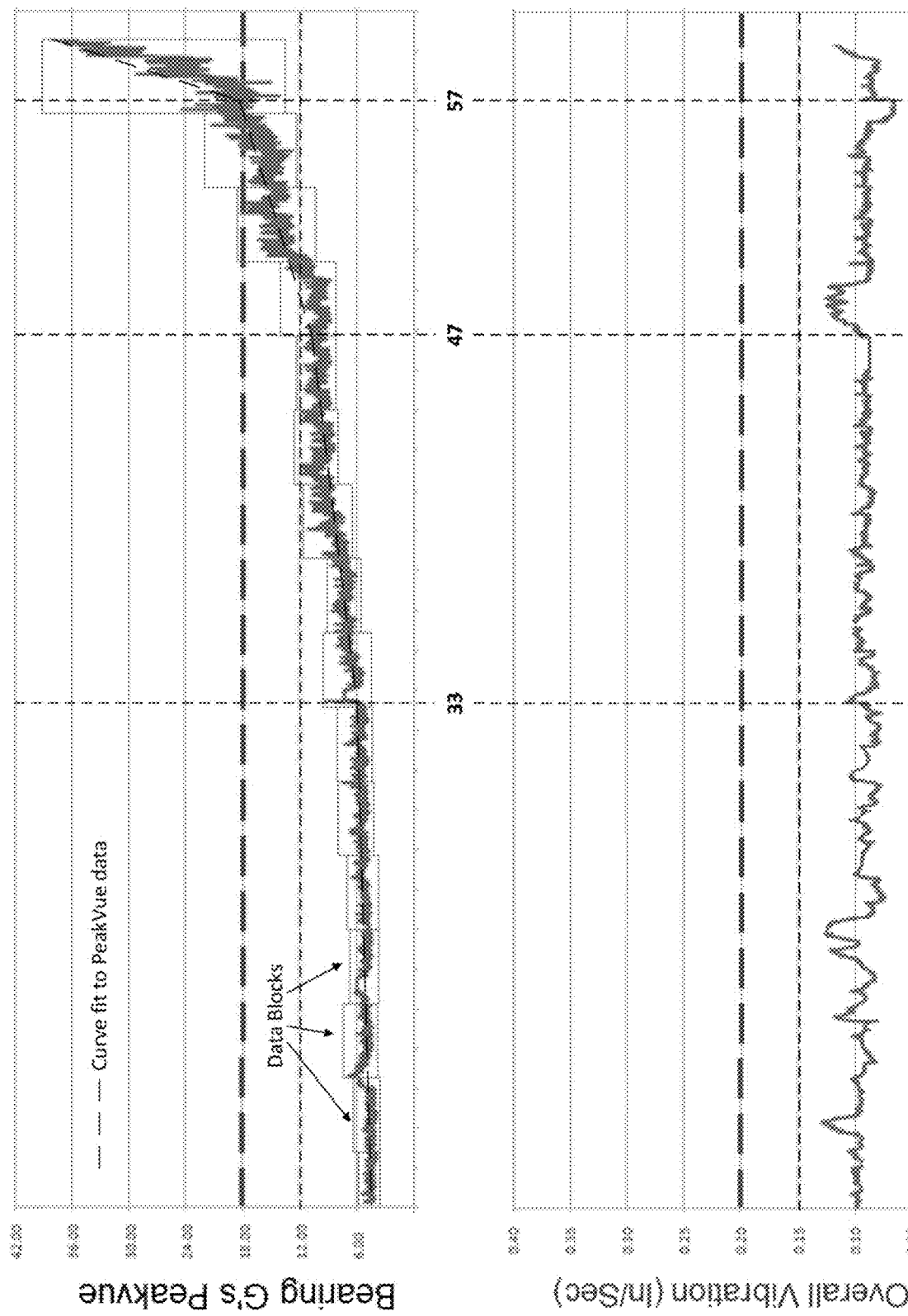
FIG. 3 depicts overall vibration data and PeakVue™ data measured at an inboard bearing of a belt driven fan over an extended period of time.

FIG. 3 depicts overall vibration data (blue) and PeakVue™ data (red) measured at an inboard bearing of a belt driven fan over a period of about two months, during which time the bearing developed a defect that progresses toward total failure. Although the overall vibration data provides no indication of imminent failure, the PeakVue™ data clearly indicates periods of accelerated increase in peak vibration values that are indicative of various stages of bearing deterioration. For example, starting at the beginning of the graph, the PeakVue™ data (collected in sixteen 90-hour data blocks) indicate that the peak vibration values begin increasing at a rate of about 0.03 g's per day. This rate of increase is sustained over the first 33 days of the trend. At about day 33, there is a noticeable inflection point, where the PeakVue™ amplitude starts increasing at a ten times faster rate of increase of about 0.3 g's per day over the next two weeks. At about day 47, there is again a marked inflection point, where the PeakVue™ amplitude starts increasing at a rate of about 0.8 g's per day for the next 10 days. At day 57, there is the most notable inflection point where the PeakVue™ amplitude starts to increase nearly 8 g's per day. Based on the elevated slope of the increase, failure of the bearing was projected to be imminent, and in fact, it failed on day 60 after only 3 days of increasing at this accelerated rate.

As indicated in FIG. 3, when a bearing or other mechanical system starts to fail, the initial failure is indicated by small and growing oscillations in the collected vibration amplitude values. Because PeakVue™ data includes only positive values, the oscillations in successive data blocks go up and down slightly (as indicated on the left side of FIG. 3) and then take on a strong positive trend (as indicated on the right side of FIG. 3). When the height of each successive data block (its total amplitude range) is larger than the height of the previous data block, this is a good indication that failure of the monitored mechanical component is imminent. In this situation, the component should be scheduled for inspection or replacement at the next opportunity.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for detecting defects in a rotational element of a machine based on changes in measured vibration energy over an extended period of time, comprising:
   (a) collecting vibration data over the extended period of time using one or more vibration sensors attached to the machine;
   (b) processing the vibration data to generate a time waveform comprising scalar vibration values that characterize the vibration data sampled during sequential sampling time intervals within the extended period of time;
   (c) determining a first rate of increase of the scalar vibration values during a first time block within the extended period of time;
   (d) determining a second rate of increase of the scalar vibration values during a second time block within the extended period of time, wherein the second time block occurs after the first time block;
   (e) based on a comparison of the second rate of increase to the first rate of increase, determining that the second rate of increase is greater than the first rate of increase; and
   (f) based on determining that the second rate of increase is greater than the first rate of increase, generating one or more alerts.

2. The method of claim 1 wherein the first rate of increase is indicative of a first stage of deterioration of the rotational element due to a defect therein, and the second rate of increase is indicative of a second stage of deterioration of the rotational element that is more severe than the first stage.

3. The method of claim 1 wherein the scalar vibration values comprise PeakVue values.

4. The method of claim 1 wherein the first and second rates of increase in the scalar vibration values are determined based on a curve fit calculated over a moving time window or a fixed interval time window, or based on an overall range calculated over a moving time window or fixed interval time window.

5. The method of claim 4 wherein the curve fit comprises a linear regression or an exponential curve fit.

6. An apparatus for detecting defects in a rotational element of a machine based on changes in measured vibration energy over an extended period of time, comprising:
   one or more vibration sensors attached to the machine for collecting vibration data over the extended period of time;
   a processor that receives the vibration data and executes instructions to process the vibration data to:
      generate a time waveform comprising scalar vibration values that characterize the vibration data sampled during sequential sampling time intervals within the extended period of time;

determine a first rate of increase of the scalar vibration values during a first time block within the extended period of time;

determine a second rate of increase of the scalar vibration values during a second time block within the extended period of time, wherein the second time block occurs after the first time block;

based on a comparison of the second rate of increase to the first rate of increase, determine that the second rate of increase is greater than the first rate of increase; and based on determining that the second rate of increase is greater than the first rate of increase, generate one or more alerts.

7. The apparatus of claim 6 in which the processor is a component of a portable vibration analyzer, a wired or wireless vibration transmitter, a continuous online vibration monitoring system, or a vibration analysis computer.

8. The apparatus of claim 7 wherein the first rate of increase in the scalar vibration values is indicative of a first stage of deterioration of the rotational element due to a defect therein, and the second rate of increase in the scalar vibration values is indicative of a second stage of deterioration of the rotational element that is more severe than the first stage.

9. The apparatus of claim 6 wherein the scalar vibration values comprise PeakVue values.

10. The apparatus of claim 6 wherein the processor determines rates of increase in the scalar vibration values based on a curve fit calculated over a moving time window.

11. The method of claim 10 wherein the curve fit comprises a linear regression or an exponential curve fit.

\* \* \* \* \*